(12) United States Patent
Hamid Muhammed et al.

(10) Patent No.: US 11,920,920 B2
(45) Date of Patent: Mar. 5, 2024

(54) PROJECTOR FOR DIFFUSE ILLUMINATION AND STRUCTURED LIGHT

(71) Applicant: TRINAMIX GMBH, Ludwigshafen am Rhein (DE)

(72) Inventors: Hamed Hamid Muhammed, Ludwigshafen (DE); Philipp Nils Raith, Ludwigshafen (DE); Benjamin Rein, Ludwigshafen (DE); Friedrich Schick, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/002,786

(22) PCT Filed: Jun. 22, 2021

(86) PCT No.: PCT/EP2021/066981
§ 371 (c)(1),
(2) Date: Dec. 21, 2022

(87) PCT Pub. No.: WO2021/259923
PCT Pub. Date: Dec. 30, 2021

(65) Prior Publication Data
US 2023/0288193 A1 Sep. 14, 2023

(30) Foreign Application Priority Data
Jun. 23, 2020 (EP) .................................... 20181658

(51) Int. Cl.
*G01B 11/25* (2006.01)
*G06T 7/521* (2017.01)
*H04N 23/56* (2023.01)

(52) U.S. Cl.
CPC .......... *G01B 11/2513* (2013.01); *G06T 7/521* (2017.01); *H04N 23/56* (2023.01); *G06T 2207/10028* (2013.01)

(58) Field of Classification Search
CPC ...... G01B 11/2513; G06T 2207/10028; G06T 7/521; H04N 23/56
(Continued)

(56) References Cited

U.S. PATENT DOCUMENTS

| 8,743,923 | B2 | 6/2014 | Geske et al. |
| 8,749,796 | B2 | 6/2014 | Pesach et al. |

(Continued)

FOREIGN PATENT DOCUMENTS

| WO | 2017222618 A1 | 12/2017 |
| WO | 2018091638 A1 | 5/2018 |

(Continued)

OTHER PUBLICATIONS

"Vertical-cavity surface-emitting laser," Wikipedia, available at <https://en.wikipedia.org/wiki/Vertical-cavity_surface-emitting_laser>.
(Continued)

*Primary Examiner* — Tri T Ton
(74) *Attorney, Agent, or Firm* — Armstrong Teasdale LLP

(57) ABSTRACT

Described herein is a projector and illumination module configured for scene illumination and pattern projection. The projector and illumination module includes at least one array of a plurality of individual emitters and at least one optical system. Each of the individual emitters is configured for generating at least one illumination light beam. The at least one optical system includes at least one array of a plurality of transfer devices. The at least one array of the plurality of transfer devices includes at least one transfer device for each of the individual emitters. The at least one
(Continued)

array of the plurality of transfer devices includes at least two groups of transfer devices. The transfer devices of one of the groups are configured for generating at least one illumination pattern. The transfer devices of the other group are configured for generating diverging light beams.

15 Claims, 2 Drawing Sheets

(58) Field of Classification Search
USPC .................................. 356/601–624, 43–50
See application file for complete search history.

(56) References Cited

U.S. PATENT DOCUMENTS

| | | | |
|---|---|---|---|
| 8,908,277 | B2 | 12/2014 | Pesach et al. |
| 10,091,433 | B1 | 10/2018 | Cavallaro et al. |
| 2016/0157725 | A1* | 6/2016 | Munoz ................. A61B 5/0082 600/407 |
| 2017/0115497 | A1* | 4/2017 | Chen ...................... G02B 27/12 |
| 2017/0186166 | A1 | 6/2017 | Grunnet-Jepsen et al. |
| 2019/0258134 | A1 | 8/2019 | Chen et al. |
| 2022/0116517 | A1* | 4/2022 | Chng ...................... G01S 17/42 |

FOREIGN PATENT DOCUMENTS

| | | |
|---|---|---|
| WO | 2018091640 A2 | 5/2018 |
| WO | 2018091649 A1 | 5/2018 |

OTHER PUBLICATIONS

"Technical Report on Solar Spectral Irradiance," International Commission on Illumination, Pub. No. CIE 85, 1st Edition, 1989.

Algorri et al., "Tunable liquid crystal multifocal micro-lens array", Scientific Reports, 7(1), p. 17318, 2017.

International Search Report and Written Opinion for corresponding PCT/EP2021/066981 dated Oct. 1, 2021; 12 pages.

* cited by examiner

PROJECTOR FOR DIFFUSE ILLUMINATION AND STRUCTURED LIGHT

CROSS-REFERENCE TO RELATED APPLICATIONS

This application is a U.S. National Phase Application of PCT/EP2021/066981, filed Jun. 22, 2021, which claims the benefit of priority to European Patent Application No. 20181658.4, filed Jun. 23, 2020, the entire contents of which are hereby incorporated by reference herein.

DESCRIPTION

Field of the invention

The invention relates to a projector and illumination module, a detector, a method for illuminating at least one object and several uses. The devices, methods and uses according to the present invention specifically may be employed for example in various areas of daily life, gaming, traffic technology, production technology, security technology, photography such as digital photography or video photography for arts, documentation or technical purposes, medical technology, home care, smart living or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

Prior art

A large number of 3D sensing systems and methods are known from the prior art. 3D sensing systems are used for several applications such as for unlock a mobile phone, tablet or smart device by authentication of the user by image processing and fraud detection by 3D sensing (also known as FaceUnlock), for mobile 3D sensing e.g. for gaming, augmented reality or virtual reality applications, or for 3D sensing with smart cameras, smart sensors, smart watches or tablets. Usually, 3D sensing systems comprise three components, i.e. an illumination module, which ensures a suitable brightness of the images, a projector module configured for projection of a grid or pattern of light spots which can be used to retrieve 3D information by any of several techniques, e.g. structured light, Time of Flight, beam profile analysis and the like, and a camera module, e.g. an image sensor module.

For example, the projector module may comprise a vertical cavity surface emitting laser (VCSEL) array and collimation optics such as comprising a micro lens array and additional lenses, as described in U.S. 8,908,277 B2, or it consists of a laser source such as an edge-emitting diode laser, collimating optics and a DOE (diffractive optical element), as described in U.S. 8,749,796 B2. For applications that don't require a bright light source, micro-LED arrays that can be individually addressable or matrix-addressable can also be used instead of the VCSEL array. The illumination module may be a flash light source e.g. based on LEDs (light emitting diodes) or based on a VCSEL array, as described in U.S. 8,743,923 B2. Here also, individually addressable or matrix-addressable micro-LED arrays can be used instead of the VCSEL array. The camera module may comprise an image sensor with lens and read-out and image processing electronics.

Moreover, VCSEL arrays are known which can be controlled in rows such as VCSEL arrays from Apple®. E.g. from Trumpf® mircrolens arrays are known which are integral to and on a laser. In addition, it is know that it is possible to manufacture free-format optical arrays such as as done by the institute for laser technologies in medicine and metrology at Ulm university.

For 3D sensing, specifically with mobile devices, generally, there are three crucial requirements: a small form factor of the module, a low bill of material and high reliability. There is a demand for increasing compactness or miniaturization, increasing multi-functionality and to minimize power consumption for the modules that are used in 3D sensing systems, while improving their performance.

PROBLEM ADDRESSED BY THE INVENTION

It is therefore an object of the present invention to provide devices and methods facing the above-mentioned technical challenges of known devices and methods. Specifically, it is an object of the present invention to provide devices and methods which allow achieving enhanced compactness and/or miniaturization, enhanced multi-functionality and minimizing power consumption for devices that are used in 3D sensing systems, while improving their performance.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

In a first aspect of the present invention a projector and illumination module is disclosed.

As used herein, the term "module" may refer to a unit or component which can be independently created, modified, replaced or exchanged between different systems. As used herein, the term "projector and illumination module" may refer to an optical device configured for providing at least one illumination pattern and/or diffuse illumination for illuminating at least one object.

As used herein, the term "object" may refer to an arbitrary object, in particular a surface or region, which is configured to reflect at least partially at least one light beam impinging on the object. The light beam may originate from the projector and illumination module illuminating the object, wherein the light beam is reflected or scattered by the object.

The projector and illumination module is configured for scene illumination and pattern projection. As used herein, the term "pattern" may refer to an arbitrary known or pre-determined arrangement comprising a plurality of arbitrarily shaped features such as symbols. The pattern may comprise a plurality of features. The pattern may comprise an arrangement of periodic or non-periodic features. The features of the pattern may be distinct from each other, wherein overlapping regions are possible. As used herein, the term "scene illumination" may refer to diffuse and/or uniform illumination of a region or area.

The projector and illumination module may have an optical axis. As used herein, the term "optical axis" generally refers to an axis of mirror symmetry or rotational symmetry of the projector and illumination module. The optical axis may be a line of symmetry of the optical setup of the projector and illumination module, in particular of an optical system. The optical system, as an example, may comprise at least one beam path, with the elements of the optical system in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses. The optical axis generally may denote the beam path.

The projector and illumination module may constitute a coordinate system, wherein a longitudinal coordinate I is a coordinate along the optical axis and wherein d is a spatial offset from the optical axis. The coordinate system may be a polar coordinate system in which the optical axis forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate z. Any direction perpendicular to the z-axis may be considered a transversal direction, and the polar coordinate and/or the polar angle may be considered a transversal coordinate.

The projector and illumination module comprises at least one array of a plurality of individual emitters and at least one optical system. Each of the individual emitters is configured for generating at least one illumination light beam. The optical system comprises at least one array of a plurality of transfer devices. The array of transfer devices comprises at least one transfer device for each of the individual emitters. The array of transfer devices comprises at least two groups of transfer devices. The transfer devices of the two groups differ in at least one property. The transfer devices of one of the groups are configured for generating at least one illumination pattern in response to illumination light beams impinging on said transfer devices. The transfer devices of the other group are configured for generating diverging light beams in response to illumination light beams impinging on said transfer devices.

As used herein, the term "emitter" may refer to at least one light source configured for generating at least one light beam. As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. As used herein, the term "individual" emitters may refer to the fact that the emitters are configured for generating light beams independent from each other.

Each of the individual emitters may comprise at least vertical-cavity surface-emitting laser (VCSEL) or at least one micro-light emitting diode (LED). As used herein, the term "vertical-cavity surface-emitting laser" may refers to a semiconductor laser diode configured for laser beam emission perpendicular with respect to a top surface. Examples for VCSELs can be found e.g. in https://en.wikipedia.org/wiki/Vertical-cavity_surface-emitting_laser. VCSELs are generally known to the skilled person such as from WO 2017/222618 A. As used herein, the term "micro-light emitting diode" may refer to a microscopically small semiconductor light emitting diode.

As used herein, the term "array of a plurality of individual emitters" may refer to a two-dimensional or one dimensional array of individual emitters. The array may comprise a plurality of individual emitters arranged in a matrix. As further used herein, the term "matrix" generally refers to an arrangement of a plurality of elements in a predetermined geometrical order. The matrix specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of emitters. Other arrangements are feasible.

The VCSELs may be arranged on a common substrate or on different substrates. The array may comprise up to 2500 VCSELs. For example, the array may comprise 38×25 VCSELs, such as a high power array with 3.5 W. For example, the array may comprise 10×27 VCSELs with 2.5 W. For example, the array may comprise 96 VCSELs with 0.9 W. A size of the array, e.g. of 2500 elements, may be up to 2 mm×2 mm.

The individual emitters may be configured for emitting light beams at a wavelength range from 800 to 1000 nm, preferably at 940 nm. For example, the VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 „ Solar spectral Irradiance".

As used herein, the term "optical system" generally refers to at least one optical device comprising at least two components. The optical system may comprise at least one array of transfer devices. The array of transfer devices may comprise a plurality of transfer devices arranged in a matrix. The matrix of transfer devices specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the transfer devices are arranged in concentric circles or ellipses about a center point. For example, the matrix may be a single row of transfer devices. Other arrangements are feasible.

The term "transfer device", also denoted as "transfer system", may generally refer to one or more optical elements which are configured for modify the light beam, such as by modifying one or more of a beam parameter of the light beam, a width of the light beam or a direction of the light beam. Each of the transfer devices may comprise at least one element selected from the group consisting of: at least one micro-lens such as at least one multifocal micro-lens or at least one individually-addressed or matrix-addressed tunable or controllable multifocal micro-lens array; at least one transmissive window; at least one diffuser; at least one diffractive optical element. Implementations may also use a diffractive optical element in addition to or instead of the micro-lenses to replicate the beams and increase their number. Using a multifocal micro-lens instead of an ordinary micro-lens array for the projection of the structured-light pattern, may allow enhancing the accuracy of the estimation of depth information and can also widen and extend the depth-range that can be detected and estimated. It is also possible to use individually-addressed or matrix-addressed tunable or controllable multifocal micro-lens arrays, as described in Algorri, J.F. et al., 2017 "Tunable liquid crystal multifocal micro-lens array", Scientific Reports, 7(1), p.17318.

The array of transfer devices comprises at least one transfer device for each of the individual emitters. Specifically, each of the transfer devices of the array is arranged such that the light beam generated by an individual emitter propagates from said the individual emitter to the associated transfer device and impinges on the associated transfer device.

The array of transfer devices comprises at least two groups of transfer devices, wherein the transfer devices of the two groups differ in at least one property. The two groups of transfer devices may differ in one or more of their refractive power, their relative position to the respective emitter, their distance to the emitter, their symmetry or the tilt of their symmetry axes with respect to the emitter's optical axes. The groups of transfer devices are arranged in at least one pattern, wherein the pattern is a line pattern or a checker-board pattern. The individual emitters associated with a first group of transfer devices may be denoted emitters of the first group and individual emitters associated with a second group of transfer devices may be denoted emitters of the second group. The array of transfer devices may comprise more than two groups of transfer devices, in particular a plurality of groups of transfer devices such as three, four, five, six or more groups.

The transfer devices of one of the groups, also denoted first group, are configured for generating at least one illumination pattern in response to illumination light beams impinging on said transfer devices. Light generated by the individual emitters of the first group may be collected by the optical system in the following way. The light which may be emitted from each of the individual emitters may be projected into one beam per emitter, respectively. Each beam may be collimated, convergent or divergent with respect to both transversal axes. When the light of the individual emitters of the first group hit the transfer devices of the first group, each of said transfer devices may form an illumination pattern, which comprises for example spots, lines, stripes or curves. The projected illumination pattern can be used to retrieve 3D information of the object.

As used herein, the term "illumination pattern" refers to a pattern for illuminating the object. In particular, the illumination pattern refers to a single beam generated by one of the individual emitters and its pattern, whereas the collective or entirety of all illumination patterns generated by the array of individual emitter may be denoted as collective illumination pattern. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector and illumination module may be configured for generate and/or to project a cloud of points or non-point-like features. For example, the projector and illumination module may be configured for generate a cloud of points or non-point-like features such that the illumination pattern may comprise a plurality of point features or non-point-like features. The illumination pattern may comprise regular and/or constant and/or periodic patterns such as a triangular pattern, a rectangular pattern, a hexagonal pattern, or a pattern comprising further convex tiltings. The illumination pattern may comprise as many features per area as possible such that a hexagonal pattern may be preferred. A distance between two features of the respective illumination pattern and/or an area of the at least one illumination feature may depend on a circle of confusion in an image determined by at least one detector.

The transfer devices of the other group, denoted second group, are configured for generating diverging light beams in response to illumination light beams impinging on said transfer devices. Light of the individual emitters of the second group may be collected by the optical system in a different way compared to the first group: The optical system may generate and/or produce individual beams, one per emitter, that are significantly diverging. As used herein, the term "diverging light beam" may refer to the fact that a beam diameter or radius of the light beam increases with distance from the transfer device. In particular, by generating and/or producing a plurality of divergent light beam a diffuse illumination is generated and/or produced. The optical system may be configured for making these beams propagate as the light of an illumination source and overlap in an object space. Thus, both scene illumination and pattern projection can be realized by a single module comprising one VCSEL or micro-LED array and an optical system having an array of transfer devices with at least two different properties as described above, or in more detail below. By this way, it is possible to realize for a given object distance e.g. a focused or diffuse illumination-like quality for one group of the emitters and a sharp or focused structured-light pattern for another group of the emitters.

The optical system may comprise at least one common optics with a focal length $f_{Optics}$. As used herein, the term "common optics" may refer to at least one optics configured for influencing light beams having passed the array of transfer devices. As used herein, the term "focal length" may refer to a distance over which incident collimated rays which may impinge the optics are brought into a "focus" which may also be denoted as "focal point". Thus, the focal length constitutes a measure of an ability of the optics to converge an impinging light beam. Thus, the common optics may comprise one or more imaging elements which can have the effect of a converging lens. Specifically, the common optics may comprise one or more lenses. The common optics may be configured for generating light beams with a desired beam diameter.

For example, the transfer devices of the first group and the second group may differ in their refractive power such that different focal lengths can be assigned to them. The transfer devices of one of the groups have a first focal lengths $f_{ML\_G1}$ and the transfer devices of the other group have a focal length $F_{ML\_G2}$. In combination with the common optics the transfer devices of one of the groups have a first refractive power $1/f_{eff\_G1}=1/f_{ML\_G1}1/f_{Optics}$, and in combination with the common optics the transfer devices of the other group have a second refractive power $1/f_{eff\_G2}=1/f_{ML\_G2}+1f/_{Optics}$. One or more of collimation properties, convergence properties or divergence properties are controllable by adjusting effective focal lengths $f_{eff\_G1}$ and $f_{eff\_G2}$ for the two groups respectively.

Emission wavelengths of the individual emitters may be identical or different. For example, individual emitters associated with the same group of transfer devices may have the same specific emission wavelength. In case of using different wavelength, the wavelength may be used for different applications. For example, a first wavelength may be used for distance determination and a second wavelength may be used for determining at least one material property of the illuminated object. Brightness of the diverging light beams and the illumination pattern may be individually controllable. Specifically, emission power of the individual emitters associated with the same group of transfer devices may be controllable and adjustable separately. By toggling the electrical current for the individual emitters of the first and the second group, it may be possible to toggle between uniform illumination and structured-light pattern projection. For example, the emission power of the individual emitters of the array is controllable and adjustable for each individual emitter. This makes it possible to reduce or switch-off the sharp structured-light pattern within sensitive regions of the object, such as the eyes. Furthermore, it makes it possible to overlay the uniform illumination or the structured-light pattern with any pattern or image, such as a QR-code, a warning text message or any kind of labeling. For example, the emission power may be controllable by setting and adjusting an electrical current individually or by utilizing liquid crystal elements between each individual emitter and its transfer device.

The individually emission power of the individual emitters may be controllable and adjustable such that bright and dark spots are projected to the object. For example, a static combination of a static micro-lens array and a static tuning map to control and adjust the emission intensity of each micro-emitter can be used. The static micro-lens array may comprise a mixture of micro-lenses with sizes and shapes that are varied randomly, pseudo-randomly or systematically, e.g. repeated systematically. The static tuning map may control and adjusts the emission power of the individual emitter in a random, pseudo-random or systematic manner.

The projector and illumination module according to the present invention has a plurality of advantages in view of known projector s and illumination devices. The number of modules can be reduced. Using one module only for scene illumination and pattern projection is possible. A combined adaptive and/or smart illumination and projection functionality can be provided. The projector and illumination module according to the present invention makes it possible to use only one miniature module to provide the needed uniform illumination and structured light, and as will be shown in more detail below, to use only one image sensor module to acquire 2D images when using uniform illumination and to acquire 3D information when using structured light. Thus, the projector and illumination module according to the present invention may allow for reduction of product complexity, a reduction of the needed form factor, a reduction of the bill of material, a reduction of the assembly costs, a reduction of failure rates in manufacture and operation. High reliability can be achieved by optimizing the design of the included modules and components to achieve better performance and to eliminate the sources of errors and miscalibration, in addition to utilizing smart and/or adaptive functionality.

In a further aspect of the present invention, a detector is disclosed. The detector comprises at least one projector and illumination module according to the present invention, such as according to one or more of the embodiments disclosed above or according to one or more of the embodiments disclosed in further detail below. The detector further comprises at least one camera module comprising at least one image sensor and at least one read-out and image processing device.

As used herein, the term "camera module" may refer to at least one optical element configured for recording at least one image. The camera module may comprise at least one bandpass filter having a transmission wavelength range adapted to the emission wavelength range of the individual emitters. The camera module may be separated from the array of individual emitters by a baseline. The camera module, in particular the image sensor, may be configured for imaging at least one 2D-image of at least one object illuminated by the diverging light beams.

As used herein, the term "image sensor" generally refers to a light-sensitive device for detecting a light beam, such as for detecting an illumination and/or a light spot generated by at least one light beam. The image sensor may have a light-sensitive area. As further used herein, a "light-sensitive area" generally refers to an area of the image sensor which may be illuminated externally, by the at least one light beam, in response to which illumination the at least one sensor signal is generated. The light-sensitive area may specifically be located on a surface of the respective image sensor. Other embodiments, however, are feasible.

The image sensor may comprise at least one sensor element. As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The sensor element may comprise a at least one matrix of optical sensors. As further used herein, the term "matrix" generally refers to an arrangement of a plurality of elements in a predetermined geometrical order. The matrix, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

The matrix may have m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n =1:1, 4:3, 16:9 or similar. As an example, the matrix may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

The optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertz-stueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix may be composed of inorganic photodiodes. Alternatively, however, a commercially available matrix may be used, such as one or more of a CCD detector, such as a CCD detector chip, and/or a CMOS detector, such as a CMOS detector chip.

Preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The detector may be configured for determining depth information, in particular of the object, by one or more of structured light, triangulation, Time of Flight (ToF), beam profile analysis using the projected illumination pattern. With respect to beam profile analysis reference is made to WO 2018/091649 A1, WO 2018/091638 A1 and WO 2018/091640 A1, the content of which is included by reference.

For example, for using beam profile analysis, the projector may be configured for generating at least two patterns for illuminating the object. As used herein, the term "beam profile" relates to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however.

The detector may comprise at least one evaluation device. As further used herein, the term "evaluation device" generally refers to an arbitrary device configured for determining the beam profile analysis, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. The beam profile analysis, including determining the depth information, in particular at least one longitudinal coordinate, of the object, are performed by the at least one evaluation device. Thus, as an example, one or more of relationships between the combined signal and the longitudinal coordinate may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the object. Additionally or alternatively, however, the evaluation device may also fully or partially be embodied by hardware.

The evaluation device may be configured for selecting at least one feature of the 2D-image. The evaluation device may be configured for selecting the feature depending on the distance and which is optimal for evaluating the beam profile. The evaluation device may be configured for selecting a feature having a spot sizes optimal for the evaluating of the beam profile. The evaluation device may be configured for using one feature or group of spots for the close distances, and the other or another group for far distances. This way, the applicable distance range can be extended, and the accuracy of the distance measurements is improved. At the same time, the robustness with respect to ambient light is improved as well.

The evaluation device may be configured for determining at least one longitudinal coordinate z of the selected feature of the 2D-image by using the so called depth-from-photonratio technique. The evaluation device may be configured for determining at least one longitudinal coordinate z of the selected feature by evaluating a combined signal Q from sensor signals of the camera module. As used herein, the term "combined signal Q" refers to a signal which is generated by combining the sensor signals, in particular by one or more of dividing the sensor signals, dividing multiples of the sensor signals or dividing linear combinations of the sensor signals. The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal coordinate z for determining the longitudinal coordinate.

For example, the evaluation device may be configured for deriving the combined signal Q by $$Q(z_O) = \frac{\int\int_{A_1} E(x, y; z_O)dxdy}{\int\int_{A_2} E(x, y; z_O)dxdy},$$

wherein x and y are transversal coordinates, A1 and A2 are different areas of at least one beam profile of a reflection light beam at the position of the camera module, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. Generally the beam profile is dependent on luminance $L(z_o)$ and beam shape $S(x,y;z_o)$, $E(x,y;z_o)=L \cdot S$. Thus, by deriving the combined signal it may allow determining the longitudinal coordinate independent from luminance. In addition, using the combined signal allows determination of the distance z, independent from the object size. Thus, the combined signal allows determination of the distance z, independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam. As used herein, the term "area of the beam profile" generally refers to an arbitrary region of the beam profile at the sensor position used for determining the combined signal Q. The light-sensitive areas may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determine the edge information by integrating and/or summing of the first area. The evaluation device may be configured for determine the center information by integrating and/or summing of the second area. For example, the beam profile may be a trapezoid beam profile and the evaluation device may be configured for determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be configured for determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

As further used herein, the term "read-out and image processing device" generally refers to an arbitrary device configured for read-out of sensor signals generated by the image sensor and image processing, preferably by using at least one data processing device and, more preferably, by using at least one processor and/or at least one application-specific integrated circuit. Thus, as an example, the at least one read-out and image processing device may comprise at least one data processing device having a software code stored thereon comprising a number of computer commands. The read-out and image processing device may provide one or more hardware elements for performing one or more of the named operations and/or may provide one or more processors with software running thereon for performing one or more of the named operations. The read-out and image processing device may comprise one or more programmable devices such as one or more computers, application-specific integrated circuits (ASICs), Digital Signal Processors (DSPs), or Field Programmable Gate Arrays (FPGAs) which are configured to perform the above-mentioned read out and processing, such as in order to determine depth information of the object. Additionally or alternatively, however, the read-out and image processing device may also fully or partially be embodied by hardware.

For details, options and definitions, reference may be made to the projector and illumination module as discussed above. Thus, specifically, as outlined above, the detector comprises using the projector and illumination module according to the present invention, such as according to one or more of the embodiments given above or given in further detail below.

In a further aspect, the present invention discloses a method for illuminating at least one object by using at least one projector and illumination module according to the present invention, such as according to one or more of the embodiments referring to a projector and illumination module according to as disclosed above or as disclosed in further detail below. Still, other types of at least one projector and illumination module according to may be used. The method comprises the following method steps, wherein the method steps may be performed in the given order or may be performed in a different order. Further, one or more additional method steps may be present which are not listed. Further, one, more than one or even all of the method steps may be performed repeatedly.

The projector and illumination module comprises at least one array of a plurality of individual emitters and at least one optical system. Each of the individual emitters generates at least one illumination light beam. The optical system comprises at least one array of a plurality of transfer devices. The array of transfer devices comprises at least one transfer device for each of the individual emitters. The array of transfer devices comprises at least two groups of transfer devices. The transfer devices of the two groups differ in at least one property. The transfer devices of one of the groups generate at least one illumination pattern in response to illumination light beams impinging on said transfer devices. The transfer devices of the other group generate diverging light beams in response to illumination light beams impinging on said transfer devices.

The method may comprise at least one imaging step, wherein the object is imaged by at least one camera module comprising at least one image sensor and at least one read-out and image processing device. The imaging may comprise imaging at least one 2D-image of at least one object illuminated by the diverging light beams.

The method further may comprise determining depth information by one or more of structured light, triangulation, Time of Flight (ToF), beam profile analysis using the projected illumination pattern.

For details, options and definitions, reference may be made to the projector and illumination module and the detector as discussed above. Thus, specifically, as outlined above, the method comprises using the projector and illumination module according to the present invention, such as according to one or more of the embodiments given above or given in further detail below.

With respect to further uses of the detector and devices of the present invention reference is made to WO 2018/091649 A1, WO 2018/091638 A1 and WO 2018/091640 A1, the content of which is included by reference.

In a further aspect of the present invention, use of the projector and illumination module according to the present invention, such as according to one or more of the embodiments given above or given in further detail below, is proposed, for a purpose of use, selected from the group consisting of: flash for machine vision; computer vision; navigation; mobile phones; digital cameras;

machine vision devices; tablets; smart cameras; cameras for navigation; vehicles cameras; traffic control such as toll cameras or photography; headlights for service robots, drones and vehicles; depth measurements; marker projection for one or more of measurement devices, 3D measurement devices, machine vision devices, inspection tools, assembling tools, robots, smart cameras, smartphones or tablets, guidance during measuring, quality inspection, assembly or mounting, interactive games.

The projector and illumination module according to the present invention can be used for several applications where a spatially and/or temporally controlled illumination source is beneficial. Specifically, the projector and illumination module according to the present invention can be used for flash for machine vision, service robots, computer vision, navigation sensors, transportation and traffic control cameras, toll cameras or photography.

For example, on the application field of flash for machine vision, computer vision, navigation, mobile phones, vehicle cameras, traffic control or toll cameras or photography using application devices such as mobile phones, digital cameras, machine vision devices, tablets, smart cameras, cameras for navigation, vehicles or traffic control or any other camera devices the following problems may be addressed by the projector and illumination module according to the present invention: avoiding that someone is blinded; avoiding the red-eye effect in photography. The red-eye effect is a common effect in photography where pupils of persons or some animals appear red in the image when a flash is used in low ambient light. Moreover, the following problems may be addressed by the projector and illumination module according to the present invention: avoiding overexposed image sections caused by too bright illumination or by reflections from shiny or reflecting object surfaces; as lash devices have high electric power consumption and suitable batteries with high charge capacity are expensive, reducing the electric power consumption of the flash device; avoiding interference with other devices; avoiding that other cameras, lidar (light detection and ranging) sensors or other light-sensitive devices are blinded or interfered by the flash light; avoiding that light-sensitive materials are illuminated by strong light; respecting privacy of persons and apply to laws and obligations to observe confidentiality or secrecy; avoiding disturbances or interferences of image processing and computer vison algorithms by uncontrolled or undesirable illumination.

For example, the projector and illumination module according to the present invention may be used as follows: Acquiring a first image using low intensity illumination and detect eyes of persons or overexposed regions by algorithms (e.g. based on feature detection or on convolutional neuronal networks). Reducing the flash illumination in those angles corresponding to the image sections which contain the detected eyes or overexposed image regions. The image sections can be chosen to be larger, to ensure that also a moving person is not blinded. Then acquiring a second image with the adjusted desired flash illumination.

For example, the projector and illumination module according to the present invention may be used as follows: Recording a first image and/or depth image. Analyzing, which regions of interest should be illuminated at all or with which level of intensity. The acquisition of the first image can be omitted in case the region of interest is already known. Possible regions of interest for special illumination can be one or more of the following: do not illuminate the sky or illuminate it with lower light intensity; do not illuminate objects at far distance as identified in the depth image or illuminate them with lower light intensity; do not illuminate image regions with the image/pixel brightness above a given threshold level or illuminate them with lower intensity; illuminate only objects or persons of interest or illuminate them with higher or lower intensity compared to the rest of the scene; do not illuminate cameras, sensors or light sensitive devices, materials or illuminate them with lower intensity compared to the rest of the scene; illuminate license plates, but not the drivers, passages or traffic participants or illuminate them with lower intensity compared to the rest of the scene, respectively; do not illuminate persons, objects or areas of privacy or secrecy concern. Calculating the desired flash intensity level for the different image regions. Acquiring a second image with the desired flash illumination. Only flash light may be applied for illumination purposes and no structured-light pattern is projected. Each individual emitter may correspond to a specific image region by following the laws of optical imaging. Reducing the emission power of the emitters may be performed by one or more of the following: reducing the electrical current for these emitters; placing a liquid crystal element array, a linear optical polarizer foil or coating before or after the micro-lens array. This way the emitted power of selected emitters can be reduced or diminished. By designing and optimizing the optics, these individual emitters may illuminate distinct solid angles and thus control the brightness of specific image regions. Ambient light or undesirable illumination can be suppressed by equipping the camera with a bandpass filter, which's wavelength range is adapted to the VCSEL or micro-LED emitters' wavelength. The light that is emitted from a VCSEL or a micro-LED array is not white, but monochromatic. For many applications, such as machine learning/vision, navigation or computer vision, a white flash is not necessary. A monochrome flash e.g. of near infrared, red or green light works fine here. For example, for mobile phone applications as e.g. user identification to unlock the mobile phone, do not need a color image. A white flash can be produced by using a light converter unit e.g. a laser activated remote phosphor (LARP) system. Such a converter unit converts e.g. blue laser light to white light as used in laser-based automotive headlights.

The following benefits can be realized: Persons are not blinded or distracted by the flash. Persons do not close eyes at image acquisition as consequence of flash light. Illumination for dark image areas can be increased locally. Overexposed image sections caused by too bright illumination or by reflections from shiny or reflecting object surfaces can be avoided, by decreasing the illumination locally within these regions. Artefacts or issues in image processing by undesired illumination are avoided. The power consumption of the flash device can be reduced. Interference of devices is avoided. Photosensitive materials are not illuminated too much. Privacy or legal requirements are concerned.

The projector and illumination module according to the present invention can be used for headlights for vehicles, service robots or drones. In this application field problems may occur such as a need to avoid that traffic participants are blinded by headlights or that the illumination of obstacles or farther-away parts of the road is often not sufficient. For example, the projector and illumination module according to the present invention may be used as follows: Reducing the emitted illumination in solid angles corresponding to specific regions of interest e.g. where traffic participants are detected by camera-based advanced driver assistance systems or camera based autonomous driving systems. Optionally increasing the emitted illumination in solid angles corresponding to specific regions of interest e.g. traffic signs, obstacles and/or the farther-away parts of the road. Selecting these regions by camera-based driver assistance systems or autonomous driving systems or by vehicle-to-vehicle communication or by car-to-infrastructure communication (C2I-, car-to-X communication). For service robots' applications, decreasing the emitted illumination in solid angles corresponding to the eyes and bright objects in the scene, and increase it for the hair or dark objects that are not skin areas which are sensitive to the emitted light. For drones and similar unmanned remotely-controlled or autonomous vehicles, light sources of a variety of wavelength ranges can be used. The region of interest of the scene that require increased or decreased illumination power depend on the application of interest. The projector and illumination module according to the present invention can be used in combination with a converter unit e.g. a laser activated remote phosphor (LARP) system to produce white headlight for the vehicles. A forward-looking camera can be used as in systems for advanced driver assistance or autonomous driving systems to determine the solid angles of emission corresponding to the regions of interest. For service robots' applications, monochromatic near infrared light might be sufficient and more comfortable to use without disturbing the users. Currently, dipped headlights are used to avoid that traffic participants are blinded by headlights. The present invention proposes to provide an adaptive and/or smart illumination. The illumination is especially better for farther distances or for selected regions of interest.

The projector and illumination module according to the present invention can be used for depth measurements such as using depth from diffusion, time of flight, structured-light based and triangulation-based depth or distance measurement. On the field of distance measurements, different types of depth or distance measurement technologies are known, which use patterns of light spots of about equal size, which corresponds to equal beam divergence, and which often suffer from one or several of the following limitations or problems: Specifically, the so called correspondence problem: The problem to identify the individual spots in an image of the spot pattern e.g. due to the respective triangulation shift of the imaged spots. Specifically, presence a limited distance range in high-intensity ambient light: The projected spot-light intensity with respect to the ambient light drops with the distance. This effect increases strongly when increasing the projection beam divergence. Therefore, spots at farther distances cannot be detected reliably anymore at high-intensity ambient light conditions. On the other hand, convergent, collimated or divergent beams appear very small in images for targets at farther distances. This makes it difficult to detect them. Furthermore, if the imaged spots get too small, it is difficult to analyze them. Distance measurement techniques, such as depth from diffusion, produce a large measurement error in this case. Moreover, some detected spots might be too bright while others are too faded if the imaged scene is complex and contains highly reflective objects and translucent or transparent objects. For example, the projector and illumination module according to the present invention may be used as follows: Using the projector and illumination module to produce and project a laser spot pattern, which contains spots of various sizes. A micro-lens array which contains a mixture of micro-lenses of various focal lengths, may be used to achieve that purpose. It is also possible to use individually-addressed or matrix-addressed tunable or controllable multifocal microlens arrays to create such a spot pattern with a mixture of various spots sizes. In addition to the spot size, it is also possible to have spots of various shapes, ellipticity and/or angular orientation of the ellipticity or symmetry axes. Smaller spots are easier to detect on objects illuminated with high-intensity, while bigger spots are better for the estimation of farther distances. Furthermore, it may be possible to enhance the dynamic range of the distance measurement system, by individually controlling and adjusting the light emission intensity for each spot, to be able to handle bright and dark spots and make them detectable simultaneously. A static combination of a static micro-lens array and a static tuning map to control and adjust the emission intensity of each micro-emitter can also be used. The static micro-lens array may comprise a mixture of micro-lenses with sizes and shapes that are varied randomly, pseudo-randomly or systematically, e.g. repeated systematically. The static tuning map may control and adjusts the emission intensity of the micro-emitter in a random, pseudo-random or systematic manner. Using the projector and illumination module according to the present invention may have the following advantages: The spot sizes of the spot groups can be adapted to be optimal for different distances: e.g. use one group of spots for the close distances, and the other or another group for far distances. This way, the applicable distance range can be extended, and the accuracy of the distance measurements is improved. At the same time, the robustness with respect to ambient light is improved as well. Different/various spot sizes, shapes, spot ellipticities or spot ellipticity axes can be used to solve the correspondence problem more easily. This allows to increase the density of the spot pattern and thus the lateral resolution. It also allows to extend the distance range towards closer distances.

The projector and illumination module according to the present invention can be used for marker projection for one or more of measurement devices, 3D measurement devices, machine vision devices, inspection tools, assembling tools, robots, smart cameras, smartphones or tablets, guidance during measuring, quality inspection, assembly or mounting, interactive games. For these applications, it is often useful to project markers or structures and/or patterns such as points, signs, arrows, lines, markers, boxes, tags, text, numbers, QR-codes or symbols, to the object or surrounding area to: Indicate points (e.g. laser pointer like) or indicate regions of interest, indicate the field of view/measurement range of the device, indicate points, distances, dimensions that where measured by pointing to/marking the relevant positions on the object or displaying the measurement result, indicate recognized objects by projecting a box or rectangle around them, indicate objects by highlighting them by increased illumination or marking them by e.g. arrows, indicate objects to pick or their order or objects to be aware of, indicate where or how or in which order to place or position objects, label objects or points of interest, lines for alignments or other guidance that are helpful during assembly, installation, mounting or fixing of objects or for drilling, indicate quality inspection results on parts. Indicate structures that are out of spec, not ok. Indicate scratches or deformations, indicate the direction, way or target where a robot, vehicle or machine or its parts is supposed to move, or project warnings, warning signs, text, tags or QR codes on or next to objects. For example, the projector and illumination module according to the present invention may be used as follows: Different group of emitters can be used for a plurality of groups. The projected light of the first group of emitters may form a pattern on objects consisting of spots, lines or stripes. This pattern can be used to retrieve 3D information of the objects or scene. The light of a second group of emitters can be used to illuminate the objects or scene. The illumination may be homogeneous or inhomogeneous. Inhomogeneous illumination can be realized and can be used e.g. to indicate and/or highlight objects or regions of interest by increased or selective illumination. The light of additional groups of individual emitters can be used to project the markers or structures: points, sign, arrows, lines, markers, boxes, tags, text, numbers, QR-codes or symbols. The light of the different groups of emitters may be toggled or superposed. It also may be completely switched off. State of the art solutions use external projectors to provide some of the mentioned projection structures. Using the projector and illumination module according to the present invention may have the following advantages: The point of origin is the same for both the 3D measurement coordinates and the projection coordinates, if the 3D measurement coordinates are retrieved from the projected grid or pattern of light spots. This reduces computation complexity, computation times and power consumption. Due to the absence of an external projector, there is no need to perform a calibration of the projector alignment with respect to the 3D-sensor and camera unit. This may reduce manufacturing times and/or costs. Additionally, the risk of a projector-calibration detuning over time is avoided and the accuracy of the projection is enhanced. The number of modules is reduced: No external marker-projection module and no external illumination module are needed. Moreover, a reduction of product complexity, a reduction of the needed form factor, a reduction of the bill of material, a reduction of the assembly costs and a reduction of failure rates in manufacture and operation may be possible.

The present invention allows individual controlling of each of the lasers of the array. Moreover, it is possible to generate highly complicated micro-arrays using lenses.

As used in herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. Herein, in most cases, when referring to the respective feature or element, the expressions "at least one" or "one or more" are not repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person recognizes, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

Overall, in the context of the present invention, the following embodiments are regarded as preferred:

Embodiment 1: A projector and illumination module configured for scene illumination and pattern projection, wherein the projector and illumination module comprises at least one array of a plurality of individual emitters and at least one optical system, wherein each of the individual emitters is configured for generating at least one illumination light beam, wherein the optical system comprises at least one array of a plurality of transfer devices, wherein the array of transfer devices comprises at least one transfer device for each of the individual emitters, wherein the array of transfer devices comprises at least two groups of transfer devices, wherein the transfer devices of the two groups differ in at least one property, wherein the transfer devices of one of the groups are configured for generating at least one illumination pattern in response to illumination light beams impinging on said transfer devices, wherein the transfer devices of the other group are configured for generating diverging light beams in response to illumination light beams impinging on said transfer devices.

Embodiment 2: The projector and illumination module according to the preceding embodiment, wherein each of the individual emitters comprise at least vertical-cavity surface-emitting laser (VCSEL) or at least one micro-light emitting diode (LED).

Embodiment 3: The projector and illumination module according to the any one of the preceding embodiments, wherein the individual emitters are configured for emitting light beams at a wave-length range from 800 to 1000 nm, preferably at 940 nm.

Embodiment 4: The projector and illumination module according to any one of the preceding embodiments, wherein emission wavelengths of the individual emitters are identical or different.

Embodiment 5: The projector and illumination module according to the preceding embodiment, wherein individual emitters associated with the same group of transfer devices have the same specific emission wavelength.

Embodiment 6: The projector and illumination module according to any one of the preceding embodiments, wherein brightness of the diverging light beams and the illumination pattern is individually controllable, wherein emission power of the individual emitters associated with the same group of transfer devices is controllable and adjustable separately.

Embodiment 7: The projector and illumination module according to any one of the preceding embodiments, wherein the emission power of the individual emitters of the array is controllable and adjustable for each individual emitter.

Embodiment 8: The projector and illumination module according to any one of the preceding embodiments, wherein the groups of transfer devices are arranged in at least one pattern, wherein the pattern is a line pattern or a checker-board pattern.

Embodiment 9: The projector and illumination module according to any one of the preceding embodiments, wherein each of the transfer devices comprise at least one element selected from the group consisting of: at least one micro-lens such as at least one multifocal micro-lens or at least one individually-addressed or matrix-addressed tunable or controllable multifocal micro-lens array; at least one transmissive window; at least one diffuser; at least one diffractive optical element.

Embodiment 10: The projector and illumination module according to any one of the preceding embodiments, wherein the two groups of transfer devices differ in one or more of their refractive power, their relative position to the respective emitter, their distance to the emitter, their symmetry or the tilt of their symmetry axes with respect to the emitter's optical axes.

Embodiment 11: The projector and illumination module according to any one of the preceding embodiments, wherein the optical system comprises at least one common optics with a focal length $f_{Optics}$, wherein the common optics comprises one or more lenses, wherein the common optics is configured for generating light beams with a desired beam diameter.

Embodiment 12: The projector and illumination module according to the preceding embodiment, wherein the transfer devices of one of the groups have a first focal lengths $f_{ML\_G1}$ and the transfer devices of the other group have a focal length $f_{ML\_G2}$, wherein in combination with the common optics the transfer devices of one of the groups have a first refractive power $1/f_{\textit{eff}\_G1}=1/f_{ML\_G1}+1/f_{Optics}$, and wherein in combination with the common optics the transfer devices of the other group have a second refractive power $1/f_{\textit{eff}\_G2}=1/f_{ML\_G2}+1/f_{Optics}$, wherein one or more of collimation properties, convergence properties or divergence properties are controllable by adjusting effective focal lengths $f_{\textit{eff}\_G1}$ and $f_{\textit{eff}\_G2}$ for the two groups respectively.

Embodiment 13: A detector comprising:
at least one projector and illumination module according to any one of the preceding embodiments;
at least one camera module comprising at least one image sensor and at least one readout and image processing device.

Embodiment 14: The detector according to the preceding embodiment, wherein the camera module is configured for imaging at least one 2D-image of at least one object illuminated by the diverging light beams.

Embodiment 15: The detector according to any one of the two preceding embodiments, wherein the detector is configured for determining depth information by one or more of structured light, triangulation, Time of Flight (ToF), beam profile analysis using the projected illumination pattern.

Embodiment 16: The detector according to any one of the preceding embodiments referring to a detector, wherein the camera module comprises at least one bandpass filter having a transmission wavelength range adapted to the emission wavelength range of the individual emitters.

Embodiment 17: The detector according to any one of the preceding embodiments referring to a detector, wherein the camera module is separated from the array of individual emitters by a baseline.

Embodiment 18: A method for illuminating at least one object by using at least one projector and illumination module according to any one of the preceding embodiments referring to a projector and illumination module, wherein the projector and illumination module comprises at least one array of a plurality of individual emitters and at least one optical system, wherein each of the individual emitters generates at least one illumination light beam, wherein the optical system comprises at least one array of a plurality of transfer devices, wherein the array of transfer devices comprises at least one transfer device for each of the individual emitters, wherein the array of transfer devices comprises at least two groups of transfer devices, wherein the transfer devices of the two groups differ in at least one property, wherein the transfer devices of one of the groups generate at least one illumination pattern in response to illumination light beams impinging on said transfer devices, wherein the transfer devices of the other group generate diverging light beams in response to illumination light beams impinging on said transfer devices.

Embodiment 19: The method according to the preceding embodiment, wherein the method comprises at least one imaging step, wherein the object is imaged by at least one camera module comprising at least one image sensor and at least one read-out and image processing device, wherein the imaging comprises imaging at least one 2D-image of at least one object illuminated by the diverging light beams.

Embodiment 20: The method according to any one of the two preceding embodiments, wherein the method further comprises determining depth information by one or more of structured light, triangulation, Time of Flight (ToF), beam profile analysis using the projected illumination pattern.

Embodiment 21: A use of the projector and illumination module according to any one of the preceding embodiments referring to a projector and illumination module, for a purpose of use, selected from the group consisting of: flash for machine vision; computer vision; navigation; mobile phones; digital cameras; machine vision devices; tablets; smart cameras; cameras for navigation; vehicles cameras; traffic control such as toll cameras or photography; headlights for service robots, drones and vehicles; depth measurements; marker projection for one or more of measurement devices, 3D measurement devices, machine vision devices, inspection tools, assembling tools, robots, smart cameras, smartphones or tablets, guidance during measuring, quality inspection, assembly or mounting, interactive games.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

Figure 1:
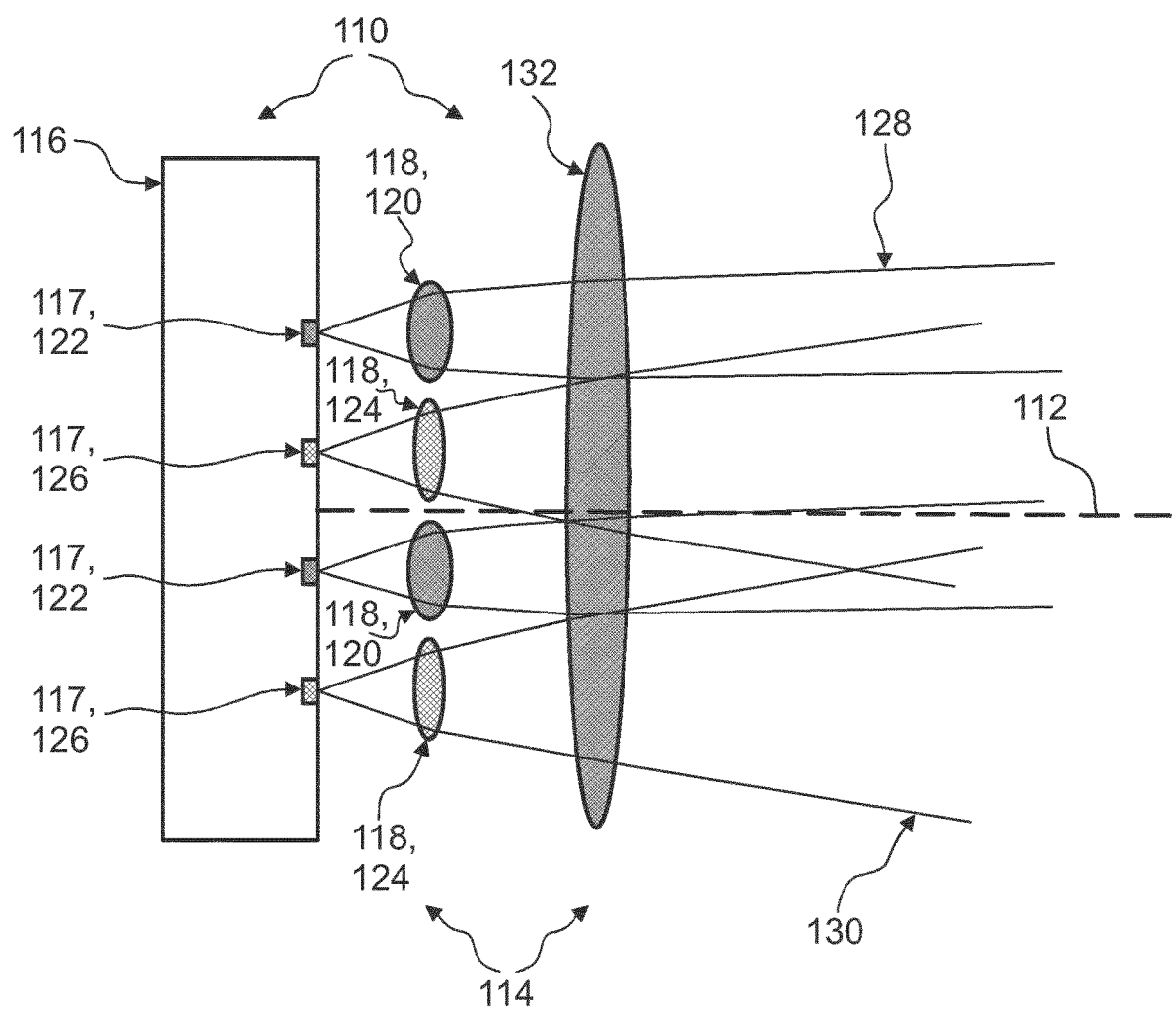
FIG. 1 shows an embodiment of a projector and illumination module according to the present invention.

DETAILED DESCRIPTION OF THE EMBODIMENTS:

FIG. 1 shows in a highly schematic fashion a first embodiment of the present invention of a projector and illumination module 110 configured for scene illumination and pattern projection. The projector and illumination module 110 may be configured for providing at least one illumination pattern and/or diffuse illumination for illuminating at least one object. The projector and illumination module 110 is configured for scene illumination and pattern projection. The illumination pattern may comprise a plurality of arbitrarily shaped features such as symbols. The illumination pattern may comprise a plurality of features. The illumination pattern may comprise an arrangement of periodic or non-periodic features. The features of the pattern may be distinct from each other, wherein overlapping regions are possible. The scene illumination may be diffuse and/or uniform illumination of a region or area.

The projector and illumination module 110 may have an optical axis 112. The optical axis 112 may be an axis of mirror symmetry or rotational symmetry of the projector and illumination module 110. The optical axis 112 may be a line of symmetry of the optical setup of the projector and illumination module 112, in particular of an optical system 114.

The projector and illumination module 110 may constitute a coordinate system, wherein a longitudinal coordinate I is a coordinate along the optical axis 112 and wherein d is a spatial offset from the optical axis. The coordinate system may be a polar coordinate system in which the optical axis forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate z. Any direction perpendicular to the z-axis may be considered a transversal direction, and the polar coordinate and/or the polar angle may be considered a transversal coordinate.

The projector and illumination module 110 comprises at least one array 116 of a plurality of individual emitters 117. Each of the individual emitters is configured for generating at least one illumination light beam. The individual emitters 117 may be configured for generating light beams independent from each other. Each of the individual emitters 117 may comprise at least vertical-cavity surface-emitting laser (VCSEL) or at least one micro-light emitting diode (LED).

The array of a plurality of individual emitters 116 may comprise a two-dimensional or one dimensional array of individual emitters 117. The array 116 may comprise a plurality of individual emitters 117 arranged in a matrix. The matrix specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of emitters 117. Other arrangements are feasible.

The VCSELs may be arranged on a common substrate or on different substrates. The array 116 may comprise up to 2500 VCSELs. For example, the array 116 may comprise 38×25 VCSELs, such as a high power array with 3.5 W. For example, the array 116 may comprise 10×27 VCSELs with 2.5 W. For example, the array may comprise 96 VCSELs with 0.9 W. A size of the array 116, e.g. of 2500 elements, may be up to 2 mm×2 mm.

The individual emitters 117 may be configured for emitting light beams at a wavelength range from 800 to 1000 nm, preferably at 940 nm. For example, the VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 „ Solar spectral Irradiance".

The projector and illumination module 110 comprises the at least one optical system 114. The optical system 114 comprises at least one array of a plurality of transfer devices 118. The array of transfer devices 118 comprises at least one transfer device 118 for each of the individual emitters 117. The array of transfer devices 118 comprises at least two groups of transfer devices 118. The transfer devices of the two groups differ in at least one property. The transfer devices 118 of one of the groups are configured for generating at least one illumination pattern in response to illumination light beams impinging on said transfer devices 118. The transfer devices 118 of the other group are configured for generating diverging light beams in response to illumination light beams impinging on said transfer devices 118.

The array of transfer devices 118 may comprise a plurality of transfer devices 118 arranged in a matrix. The matrix of transfer devices 118 specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the transfer devices 118 are arranged in concentric circles or ellipses about a center point. For example, the matrix may be a single row of transfer devices 118. Other arrangements are feasible.

The transfer device 118 may be configured for modify the light beam, such as by modifying one or more of a beam parameter of the light beam, a width of the light beam or a direction of the light beam. Each of the transfer devices 118 may comprise at least one element selected from the group consisting of: at least one micro-lens such as at least one multifocal micro-lens or at least one individually-addressed or matrix-addressed tunable or controllable multifocal micro-lens array; at least one transmissive window; at least one diffuser; at least one diffractive optical element. Implementations may also use a diffractive optical element in addition to or instead of the micro-lenses to replicate the beams and increase their number. Using a multifocal micro-lens instead of an ordinary micro-lens array for the projection of the structured-light pattern, may allow enhancing the accuracy of the estimation of depth information and can also widen and extend the depth-range that can be detected and estimated. It is also possible to use individually-addressed or matrix-addressed tunable or controllable multifocal micro-lens arrays, as described in Algorri, J.F. et al., 2017 "Tunable liquid crystal multifocal micro-lens array", Scientific Reports, 7(1), p.17318.

The array of transfer devices 118 comprises at least one transfer device 118 for each of the individual emitters. Specifically, each of the transfer devices 118 of the array is arranged such that the light beam generated by an individual emitter 117 propagates from said the individual emitter 117 to the associated transfer device 118 and impinges on the associated transfer device 118.

The array of transfer devices 118 comprises at least two groups of transfer devices 118, wherein the transfer devices of the two groups differ in at least one property. The two groups of transfer devices 118 may differ in one or more of their refractive power, their relative position to the respective emitter, their distance to the emitter, their symmetry or the tilt of their symmetry axes with respect to the emitter's optical axes. The groups of transfer devices 118 are arranged in at least one pattern, wherein the pattern is a line pattern or a checker-board pattern. The individual emitters 117 associated with a first group 120 of transfer devices 118 may be denoted emitters of the first group 122 and individual emitters 117 associated with a second group 124 of transfer devices 118 may be denoted emitters of the second group 126. The array of transfer devices 118 may comprise more than two groups of transfer devices 118, in particular a plurality of groups of transfer devices 118 such as three, four, five, six or more groups. In FIG. 1, the transfer device 118 of the first group 120 and of the second group 124 are designed as micro-lenses having different properties.

The transfer devices 118 of the first group 120 are configured for generating at least one illumination pattern in response to illumination light beams impinging on said transfer devices 118. Light generated by the individual emitters 117 of the first group 122 may be collected by the optical system 114 in the following way. The light which may be emitted from each of the individual emitters may be projected into one beam per emitter 117, respectively. Each beam may be collimated, convergent or divergent with respect to both transversal axes. When the light of the individual emitters 117 of the first group 122 hit the transfer devices 118 of the first group 120, each of said transfer devices 118 may form an illumination pattern, which comprises for example spots, lines, stripes or curves. The projected illumination pattern can be used to retrieve 3D information of the object. In FIG. 1, the light beams having passed the transfer devices 118 of the first group 120 are shown as collimated or slowly diverging beams 128.

In particular, the illumination pattern may be a single beam generated by one of the individual emitters 117 and its pattern, whereas the collective or entirety of all illumination patterns generated by the array of individual emitter 117 may be denoted as collective illumination pattern. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the projector and illumination module 110 may be configured for generate and/or to project a cloud of points or non-point-like features. For example, the projector and illumination module 110 may be configured for generate a cloud of points or non-point-like features such that the illumination pattern may comprise a plurality of point features or non-point-like features. The illumination pattern may comprise regular and/or constant and/or periodic patterns such as a triangular pattern, a rectangular pattern, a hexagonal pattern, or a pattern comprising further convex tiltings. The illumination pattern may comprise as many features per area as possible such that a hexagonal pattern may be preferred. A distance between two features of the respective illumination pattern and/or an area of the at least one illumination feature may depend on a circle of confusion in an image determined by at least one detector.

The transfer devices 118 of the second group 124 are configured for generating diverging light beams 130 in response to illumination light beams impinging on said transfer devices 118. Light of the individual emitters 117 of the second group 124 may be collected by the optical system 114 in a different way compared to the first group 120: The optical system 114 may generate and/or produce individual beams 130, one per emitter 117, that are significantly diverging. In particular, by generating and/or producing a plurality of divergent light beam a diffuse illumination is generated and/or produced. The optical system 114 may be configured for making these beams 130 propagate as the light of an illumination source and overlap in an object space. Thus, both scene illumination and pattern projection can be realized by a single module comprising one VCSEL or micro-LED array and an optical system having an array of transfer devices with at least two different properties as described above, or in more detail below. By this way, it is possible to realize for a given object distance e.g. a focused or diffuse illumination-like quality for one group of the emitters and a sharp or focused structured-light pattern for another group of the emitters.

The optical system 114 may comprise at least one common optics 132 with a focal length $f_{Optics}$. Specifically, the common optics 132 may comprise one or more lenses. The common optics 132 may be configured for generating light beams with a desired beam diameter.

For example, the transfer devices 118 of the first group 120 and the second group 124 may differ in their refractive power such that different focal lengths can be assigned to them. The transfer devices 118 of one of the groups have a first focal lengths N $f_{ML\_G1}$ and the transfer devices 118 of the other group have a focal length $f_{ML\_G2}$. In combination with the common optics 132 the transfer devices 118 of one of the groups have a first refractive power $1/f_{eff\_G1}=1/f_{ML\_G1}+1/f_{Optics}$, and in combination with the common optics the transfer devices 118 of the other group have a second refractive power $1/f_{eff\_G2}=1/f_{ML\_G2}1/f_{Optics}$. One or more of collimation properties, convergence properties or divergence properties are controllable by adjusting effective focal lengths $f_{eff\_G1}$ and $f_{eff\_G2}$ for the two groups respectively.

Emission wavelengths of the individual emitters 117 may be identical or different. For example, individual emitters 117 associated with the same group of transfer devices 118 may have the same specific emission wavelength. Brightness of the diverging light beams and the illumination pattern may be individually controllable. Specifically, emission power of the individual emitters 117 associated with the same group of transfer devices 118 may be controllable and adjustable separately. By toggling the electrical current for the individual emitters 117 of the first and the second group, it may be possible to toggle between uniform illumination and structured-light pattern projection. For example, the emission power of the individual emitters 144 of the array 116 is controllable and adjustable for each individual emitter 117. This makes it possible to reduce or switch-off the sharp structured-light pattern within sensitive regions of the object, such as the eyes. Furthermore, it makes it possible to overlay the uniform illumination or the structured-light pattern with any pattern or image, such as a QR-code, a warning text message or any kind of labeling. For example, the emission power may be controllable by setting and adjusting an electrical current individually or by utilizing liquid crystal elements between each individual emitter 117 and its transfer device 118.

The individually emission power of the individual emitters 117 may be controllable and adjustable such that bright and dark spots are projected to the object. For example, a static combination of a static micro-lens array and a static tuning map to control and adjust the emission intensity of each micro-emitter can be used. The static micro-lens array may comprise a mixture of micro-lenses with sizes and shapes that are varied randomly, pseudo-randomly or systematically, e.g. repeated systematically. The static tuning map may control and adjusts the emission power of the individual emitter in a random, pseudo-random or systematic manner.

Figure 2:
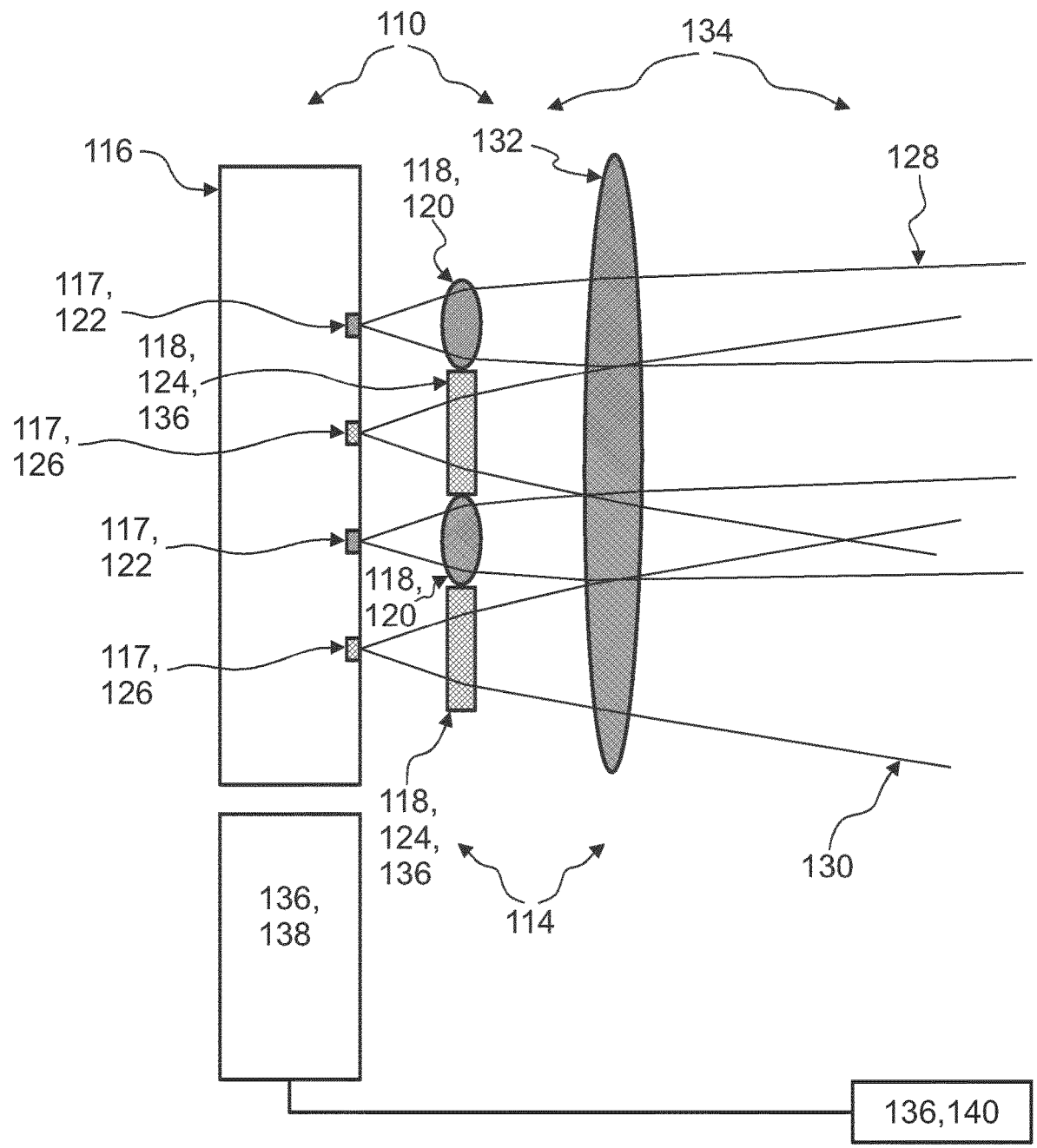
FIG. 2 shows an embodiment of a detector according to the present invention.

FIG. 2 shows an embodiment of a detector 134 according to the present invention. The detector 134 comprises the at least one projector and illumination module 110 according to the present invention. In the embodiment of FIG. 2, the transfer devices 118 of the first group 120 are designed as micro-lens and the transfer devices 118 of the second group 124 may be transparent windows 136. With respect to further components of the projector and illumination module 110 reference is made to FIG. 1.

The detector 134 further comprises at least one camera module 136 comprising at least one image sensor 138 and at least one read-out and image processing device 140. The camera module 136 may be configured for recording at least one image. The camera module 136 may comprise at least one bandpass filter having a transmission wavelength range adapted to the emission wavelength range of the individual emitters 117. The camera module 136 may be separated from the array 116 of individual emitters 117 by a baseline. The camera module 136, in particular the image sensor 138, may be configured for imaging at least one 2D-image of at least one object illuminated by the diverging light beams.

The image sensor 138 may be or may comprise a light-sensitive device for detecting a light beam, such as for detecting an illumination and/or a light spot generated by at least one light beam. The image sensor 138 may have a light-sensitive area. The image sensor 138 may comprise at least one sensor element. The image sensor 138 may comprise at least one CCD detector, such as a CCD detector chip, and/or at least one CMOS detector, such as a CMOS detector chip.

The detector 124 may be configured for determining depth information, in particular of the object, by one or more of structured light, triangulation, Time of Flight (ToF), beam profile analysis using the projected illumination pattern. With respect to beam profile analysis reference is made to WO 2018/091649 A1, WO 2018/091638 A1 and WO 2018/091640 A1, the content of which is included by reference.

The read-out and image processing device 140 may be configured for read-out of sensor signals generated by the image sensor and image processing, preferably by using at least one data processing device and, more preferably, by using at least one processor and/or at least one application-specific integrated circuit. Thus, as an example, the at least one read-out and image processing device 140 may comprise at least one data processing device having a software code stored thereon comprising a number of computer commands. The read-out and image processing device 140 may provide one or more hardware elements for performing one or more of the named operations and/or may provide one or more processors with software running thereon for performing one or more of the named operations. The read-out and image processing device 140 may comprise one or more programmable devices such as one or more computers, application-specific integrated circuits (ASICs), Digital Signal Processors (DSPs), or Field Programmable Gate Arrays (FPGAs) which are configured to perform the abovementioned read out and processing, such as in order to determine depth information of the object. Additionally or alternatively, however, the read-out and image processing device 140 may also fully or partially be embodied by hardware.

LIST OF REFERENCE NUMBERS

110 projector and illumination module
112 optical axis
114 optical system
116 array
117 individual emitter
118 transfer device
120 first group of transfer devices
122 first group of emitters
124 second group of transfer devices
126 second group of emitters
128 collimated beams
130 diverging light beams
132 common optics
134 detector
136 camera module
138 image sensor
140 read-out and image processing device

CITED DOCUMENTS

U.S. 8,908,277 B2
U.S. 8,749,796 B2
U.S. 8,743,923 B2
https://en.wikipedia.org/wiki/Vertical-cavity_surface-emitting_laser
WO 2017/222618 A
CIE 085-1989 „Solar spectral Irradiance"
Algorri, J.F. et al., 2017 "Tunable liquid crystal multifocal micro-lens array", Scientific Reports, 7(1), p.17318
WO 2018/091649 A1
WO 2018/091638 A1
WO 2018/091640 A1

The invention claimed is:

1. A projector and illumination module configured for scene illumination and pattern projection, wherein the projector and illumination module comprises at least one array of a plurality of individual emitters and at least one optical system, wherein each of the individual emitters is configured for generating at least one illumination light beam, wherein the at least one optical system comprises at least one array of a plurality of transfer devices, wherein the at least one array of the plurality of transfer devices comprises at least one transfer device for each of the individual emitters, wherein the at least one array of the plurality of transfer devices further comprises at least two groups of transfer devices, wherein the transfer devices of the two groups differ in at least one property, wherein the transfer devices of one of the groups are configured for generating collimated light beams in response to illumination light beams impinging on said transfer devices, wherein the transfer devices of the other group are configured for generating diverging light beams in response to illumination light beams impinging on said transfer devices; wherein brightness of the diverging light beams and the collimated light beams are individually controllable, wherein emission power of the individual emitters associated with the same group of transfer devices is controllable and adjustable separately.

2. The projector and illumination module according to claim 1, wherein each of the individual emitters comprise at least one vertical-cavity surface-emitting laser (VCSEL) or at least one micro-light emitting diode (LED).

3. The projector and illumination module according to claim 1, wherein the individual emitters are configured for emitting light beams at a wavelength range from 800 to 1000 nm.

4. The projector and illumination module according to claim 1, wherein emission wavelengths of the individual emitters are identical or different.

5. The projector and illumination module according to claim 1, wherein individual emitters associated with the same group of transfer devices have a same specific emission wavelength.

6. The projector and illumination module according to claim 1, wherein emission power of the individual emitters of the at least one array is controllable and adjustable for each individual emitter.

7. The projector and illumination module according to claim 1, wherein the at least two groups of transfer devices are arranged in at least one pattern, wherein the at least one pattern is a line pattern or a checker-board pattern.

8. The projector and illumination module according to claim 1, wherein each of the transfer devices comprise at least one element selected from the group consisting of: at least one micro-lens; at least one transmissive window; at least one diffuser; and at least one diffractive optical element.

9. The projector and illumination module according to claim 1, wherein the at least two groups of transfer devices differ in one or more of their refractive power, their relative position to the respective emitter, their distance to the respective emitter, and their symmetry or a tilt of their symmetry axes with respect to optical axes of the respective emitter.

10. A detector comprising:
at least one projector and illumination module according to claim 1; and
at least one camera module comprising at least one image sensor and at least one read-out and image processing device.

11. The detector according to claim 10, wherein the at least one camera module is configured for imaging at least one 2D-image of at least one object illuminated by the diverging light beams.

12. The detector according to claim 10, wherein the detector is configured for determining depth information by one or more of structured light, triangulation, Time of Flight (ToF), and beam profile analysis using the projected illumination pattern.

13. A method for illuminating at least one object by using at least one projector and illumination module according to claim 1, wherein the at least one projector and illumination module comprises at least one array of a plurality of individual emitters and at least one optical system, wherein each of the individual emitters generates at least one illumination light beam, wherein the at least one optical system comprises at least one array of a plurality of transfer devices, wherein the at least one array of the plurality of transfer devices comprises at least one transfer device for each of the individual emitters, wherein the at least one array of the plurality of transfer devices comprises at least two groups of transfer devices, wherein the transfer devices of the two groups differ in at least one property, wherein the transfer devices of one of the groups generate at least one illumination pattern in response to illumination light beams impinging on said transfer devices, wherein the transfer devices of the other group generate diverging light beams in response to illumination light beams impinging on said transfer devices.

14. The projector and illumination module according to claim 1, wherein the individual emitters are configured for emitting light beams at a wavelength of 940 nm.

15. The projector and illumination module according to claim 1, wherein each of the transfer devices comprise at least one element selected from the group consisting of: at least one multifocal micro-lens; at least one individually-addressed or matrix-addressed tunable or controllable multifocal micro-lens array; at least one transmissive window; at least one diffuser; and at least one diffractive optical element.

* * * * *